(12) United States Patent
Hoyer et al.

(10) Patent No.: US 12,125,203 B2
(45) Date of Patent: Oct. 22, 2024

(54) OPTICAL MONITORING DEVICE AND METHOD AND DATA PROCESSING SYSTEM FOR DETERMINING INFORMATION FOR DISTINGUISHING BETWEEN CELLS

(71) Applicant: Carl Zeiss Meditec AG, Jena (DE)

(72) Inventors: Patrick Hoyer, Ulm (DE); Stefan Saur, Aalen (DE); Gerald Panitz, Bopfingen (DE)

(73) Assignee: CARL ZEISS MEDITEC AG, Jena (DE)

( * ) Notice: Subject to any disclaimer, the term of this patent is extended or adjusted under 35 U.S.C. 154(b) by 0 days.

(21) Appl. No.: 17/780,017

(22) PCT Filed: Oct. 14, 2020

(86) PCT No.: PCT/EP2020/078947
§ 371 (c)(1),
(2) Date: May 25, 2022

(87) PCT Pub. No.: WO2021/104740
PCT Pub. Date: Jun. 3, 2021

(65) Prior Publication Data
US 2022/0392061 A1    Dec. 8, 2022

(30) Foreign Application Priority Data

Nov. 29, 2019   (DE) ................. 10 2019 132 514.5

(51) Int. Cl.
*G06T 7/00*        (2017.01)
*G06T 7/30*        (2017.01)
*G06V 20/69*       (2022.01)

(52) U.S. Cl.
CPC .............. *G06T 7/0012* (2013.01); *G06T 7/30* (2017.01); *G06V 20/698* (2022.01);
(Continued)

(58) Field of Classification Search
CPC . G06T 2207/10016; G06T 7/11; G06T 7/215; G06V 20/69
See application file for complete search history.

(56) References Cited

U.S. PATENT DOCUMENTS

| 4,175,860 A | 11/1979 | Bacus |
| 5,768,412 A * | 6/1998 | Mitsuyama ............... G06T 7/11 |
| | | 382/164 |

(Continued)

FOREIGN PATENT DOCUMENTS

| CN | 107730567 | 2/2018 |
| CN | 109034208 A | 12/2018 |

(Continued)

OTHER PUBLICATIONS

International Search Report for International Application No. PCT/EP2020/078947, mailed Dec. 23, 2020 (4 pages).

(Continued)

*Primary Examiner* — Gandhi Thirugnanam
(74) *Attorney, Agent, or Firm* — NIXON PEABODY LLP; Jeffrey L. Costellia (57) ABSTRACT

The invention relates to a method for determining information for distinguishing between tissue fluid cells and tissue cells in a high-resolution image of a tissue area. In the method, images stored temporarily with a low resolution and a high image rate before the high-resolution image is recorded are accessed and the information for distinguishing between tissue fluid cells and tissue cells is obtained from the temporarily stored images with the low resolution and the high image rate.

16 Claims, 5 Drawing Sheets

(52) U.S. Cl.
CPC .............. *G06T 2207/10016* (2013.01); *G06T 2207/10056* (2013.01); *G06T 2207/10068* (2013.01); *G06T 2207/20016* (2013.01); *G06T 2207/30004* (2013.01); *G06V 2201/03* (2022.01)

(56) References Cited

U.S. PATENT DOCUMENTS

| | | | |
|---|---|---|---|
| 7,404,640 B2 | 7/2008 | Ferguson et al. | |
| 9,794,527 B1* | 10/2017 | Balez | G06F 3/038 |
| 9,921,406 B2 | 3/2018 | Wang et al. | |
| 2005/0219642 A1 | 10/2005 | Yachida et al. | |
| 2006/0014238 A1* | 1/2006 | Gholap | G06V 10/46 |
| | | | 702/19 |
| 2007/0019854 A1* | 1/2007 | Gholap | G06T 7/0012 |
| | | | 382/133 |
| 2007/0069106 A1* | 3/2007 | Krief | G06T 5/50 |
| | | | 250/201.3 |
| 2007/0286462 A1* | 12/2007 | Usher | G06V 40/193 |
| | | | 382/115 |
| 2008/0019589 A1* | 1/2008 | Yoon | G06V 40/28 |
| | | | 382/165 |
| 2008/0212866 A1* | 9/2008 | Lett | G01N 21/6458 |
| | | | 382/133 |
| 2010/0021084 A1* | 1/2010 | Douglas | G06T 3/4053 |
| | | | 382/299 |
| 2010/0128926 A1* | 5/2010 | Iwasaki | G06T 7/215 |
| | | | 382/284 |
| 2010/0135566 A1* | 6/2010 | Joanidopoulos | G06T 7/11 |
| | | | 382/133 |
| 2010/0157037 A1* | 6/2010 | Iketani | A61B 1/0638 |
| | | | 348/220.1 |
| 2010/0157308 A1 | 6/2010 | Xie | |
| 2012/0010528 A1* | 1/2012 | Donovan | G06T 7/194 |
| | | | 382/128 |
| 2012/0123271 A1 | 5/2012 | Cai | |
| 2015/0363001 A1* | 12/2015 | Malzbender | G06V 10/7715 |
| | | | 706/18 |
| 2016/0051131 A1 | 2/2016 | Jeong et al. | |
| 2017/0367574 A1 | 12/2017 | Belthangady et al. | |
| 2019/0334619 A1* | 10/2019 | Aoyama | G06V 10/22 |
| 2020/0314356 A1* | 10/2020 | Storer | G06T 7/194 |
| 2022/0359077 A1* | 11/2022 | Chorev | G06V 20/695 |
| 2022/0392061 A1* | 12/2022 | Hoyer | G06T 7/30 |

FOREIGN PATENT DOCUMENTS

| | | | | |
|---|---|---|---|---|
| DE | 102008059788 | | 8/2010 | |
| GB | 2465686 | | 6/2010 | |
| JP | 2001515679 A | * | 1/2001 | |
| WO | WO-2005096225 A1 | * | 10/2005 | .......... G06K 9/0014 |
| WO | WO-2006122251 A2 | * | 11/2006 | .......... G06K 9/0014 |

OTHER PUBLICATIONS

Bizzego et al., "Evaluating reproducibility of AI algorithms in digital pathology with DAPPER," PLOS Computational Biology, 15(3):e1006269, Mar. 27, 2019, pp. 1-24.

Fuchs et al., "Computational pathology: Challenges and promises for tissue analysis," Computerized Medical Imaging and Graphics, 35 (2011), pp. 515-530.

International Preliminary Report on Patentability for International Application No. PCT/EP2020/078947, mailed May 17, 2022, (7 pages).

Chinese Office Action for Application No. 202080082858.0, issuing date May 5, 2023 (18 pages).

Chinese Office Action for Application No. 202080082858.0, issuing date Mar. 22, 2024 (19 pages).

* cited by examiner

OPTICAL MONITORING DEVICE AND METHOD AND DATA PROCESSING SYSTEM FOR DETERMINING INFORMATION FOR DISTINGUISHING BETWEEN CELLS

CROSS-REFERENCE TO RELATED APPLICATIONS

The present application is the U.S. national stage entry of International Application No. PCT/EP2020/078947, filed Oct. 14, 2020, which claims the benefit of and priority to German Patent Application No. 10 2019 132 514.5, filed Nov. 29, 2019, the contents of which are incorporated by reference herein in their entirety.

The present invention relates to a computer-implemented method for determining information for distinguishing between tissue fluid cells and tissue cells in a high-resolution image of a tissue region, to a data processing system for carrying out the method, and to a computer program and a nonvolatile computer-readable storage medium with instructions for determining information for distinguishing between tissue fluid cells and tissue cells in a high-resolution image of a tissue region. Additionally, the invention relates to a method for recording a high-resolution image of a tissue region with information which is assigned to the image and which serves for distinguishing between tissue fluid cells and tissue cells by means of a scanning imaging method, and to an optical observation apparatus.

In endoscopy and, in particular, in endomicroscopy, the development of scanning imaging methods was promoted by the development of scanning devices based on microelectromechanical systems (MEMS), which facilitate lateral scanning of an object using a moveable optical fiber or by means of a movable microelectromechanical mirror (MEMS mirror) in the case of a stationary fiber. A scanning device for an optical fiber based on microelectromechanical systems is described in US 2016/0051131 A1, for example. Scanning imaging methods are used, in particular, within the scope of optical coherence tomography (OCT) or within the scope of confocal imaging, as described in US 2010/0157308 A1 and U.S. Pat. No. 9,921,406 B2, for example.

In the case of scanning imaging methods, the objects are for example first scanned along a line, which is usually referred to as x-direction or x-line. This is followed by a line feed in the y-direction and, subsequently, by a scan along a line in the x-direction again. The smallest possible pitch which the lines can have from one another in the y-direction defines the resolution of the image obtained by the scanning imaging method in this case if all lines are used for the scan. However, an image in which all lines are used for the scan also requires the longest scanning process since many lines have to be scanned.

On account of the long scan duration, the frame rate in a video stream based on the scanning imaging method is low. Here, the frame rate specifies the number of frames per second (fps) achievable in the video stream. To be able to achieve higher frame rates, it is necessary to reduce the time duration required to record a frame using the scanning imaging method. As a rule, this is achieved by virtue of not using all lines in a scan for a frame but only, for example, using every 10th line, as a result of which it is possible to increase the frame rate, albeit to the detriment of the resolution of the frames. By way of example, a scanning endoscope system with an adjustable resolution is described in US 2010/0157037 A1 for an endoscope with a spirally scanning scanner.

In the medical field, scanning imaging methods are used, for example, within the scope of confocal microscopy, in particular within the scope of confocal endomicroscopy, and within the scope of optical coherence tomography for recording high-resolution images of tissue regions, on the basis of which tissue changes can be diagnosed. A problem in this case is that it is hard to distinguish between tissue cells and cells of tissue fluids in the images obtained by the scanning imaging methods.

It is therefore a first object of the present invention to provide a computer-implemented method for determining information for distinguishing between tissue fluid cells and tissue cells in a high-resolution image of a tissue region, and to provide a data processing system for carrying out the method. A second object is to provide a computer program and a nonvolatile computer-readable storage medium with instructions, which facilitate a determination of information for distinguishing between tissue fluid cells and tissue cells in a high-resolution image of a tissue region.

A third object of the present invention is to provide a method for recording a high-resolution image of a tissue region by means of a scanning imaging method, by means of which it is possible to determine information for distinguishing between tissue fluid cells and tissue cells, which information is also assigned to the high-resolution image.

A fourth object of the present invention lies in the provision of an optical observation apparatus, which facilitates a determination of information for distinguishing between tissue fluid cells and tissue cells in a high-resolution image of a tissue region.

According to a first aspect of the present invention, a computer-implemented method for determining information for distinguishing between tissue fluid cells and tissue cells in a high-resolution image of a tissue region is provided. A distinction is made between, firstly, tissue fluid cells and, secondly, tissue cells within the scope of the present invention. In this case, tissue cells are considered to be those cells that are bound to an extracellular matrix. In particular, tissue cells are the cells of the epithelial tissue, of the connective and supporting tissue, of the muscle tissue and of the nerve tissue. By contrast, tissue fluid cells are considered to be those cells that are located in a tissue fluid, in particular in blood or in lymph.

In the computer-implemented method according to the invention, buffered images which were recorded and buffered with a low resolution and a high frame rate before the high-resolution image was recorded are accessed. The information for distinguishing between tissue fluid cells and tissue cells is obtained from the low-resolution buffered images with the high frame rate.

Microendoscopic optical observation apparatuses, in particular, are frequently operated with scanning image recording equipment in a low image resolution mode while the user navigates to the tissue region of interest or searches through the tissue in order to find tissue changes. Thus, image resolution within the scope of the present invention should not be understood to be the optical resolution, as arises from the optical properties of the imaging optical elements, but means the pixel resolution which arises from the size of the image-forming pixels and the pitch of these pixels from one another. A frame can be recorded quicker using the scanning image recording equipment on account of the reduced image resolution, and so a high frame rate can be achieved. As a result, a frame rate of 4 frames per second or more can be offered to the user. As soon as the user has reached the target region or found a site with tissue changes, a high-resolution image is required to examine the corresponding tissue region in more detail. A problem here is to make a distinction in the high-resolution image between, firstly, tissue fluid cells and, secondly, tissue cells embedded in an extracellular matrix. To obtain the necessary information which facilitates a distinction between tissue fluid cells and tissue cells, the computer-implemented method according to the invention exploits the fact that a number of low-resolution images were recorded with a high frame rate before the high-resolution image was recorded. These images contain information which allows the distinction to be made between tissue fluid cells and tissue cells embedded in the extracellular matrix. On account of the high frame rate, the tissue fluid cells moving relative to the extracellular matrix are easy to find in the low-resolution images on account of their movement and the altered position in the frames emerging as a result, under the proviso that a number of temporally successive low-resolution images are available. The computer-implemented method according to the invention can take these images from a buffer, in which said images are buffered on an ongoing basis. If a high-resolution image is now created, the method can access the buffered images in order to obtain and prepare the information which facilitates the distinction between tissue fluid cells and tissue cells. This information is based, in particular, on the detection of positional changes of cells in relation to an image background. By way of example, cells which are distributed in the frames and which have substantially the same relative position with respect to one another in all frames can be considered to be the image background.

In the simplest case, the computer-implemented method can generate a video sequence from at least some of the low-resolution buffered images with the high frame rate, said video sequence then being depicted next to the high-resolution image or being overlaid on the high-resolution image. In this video sequence, the tissue fluid cells move in relation to the tissue cells embedded in the extracellular matrix, and therefore are easy to identify for an observer of the video sequence.

An alternative option for representing the information for distinguishing between tissue fluid cells and tissue cells consists of determining an image background, for instance cells which substantially have the same relative position to one another in all frames, and those image elements that move in relation to the image background, in the low-resolution buffered images with the high frame rate. Those image elements which have been determined as moving image elements in relation to the image background can then be represented with emphasis in an image. In particular, they can also be overlaid on the high-resolution image such that the tissue fluid cells are directly represented with emphasis in the high-resolution image. Alternatively, there is also the possibility of displaying a second image, in which the tissue fluid cells are emphasized, next to the high-resolution image. By way of example, the image elements that move in relation to the image background can be determined on the basis of an analysis of a video sequence created on the basis of the low-resolution images with the high frame rate. In principle, however, two images which have a suitable time interval between them to be able to deduce the moving image elements from the different positions of certain image elements relative to the image background are sufficient. Naturally, there is also the option of overlaying the video sequence on the high-resolution image.

If the object of which the high-resolution image is taken is living tissue, physiological processes lead to continuous movement of the tissue occurring. As a result, the imaged object adopts a slightly different position in each image of the buffered images. In other words, the image background, in relation to which the tissue fluid cells move, is likewise in motion. To compensate this movement in the created video sequence or in the image in which the image elements that move in relation to the image background are presented with emphasis, the low-resolution buffered images with the high frame rate used to generate the video sequence or determine the image elements that move in relation to the image background can be registered in relation to a reference image. That is to say, all images apart from the reference image are subjected to a transformation which leads to certain structures of the image background being situated in the same image portion in each image. As a rule, the utilized transformations contain at least one displacement of the object in the image. However, they may also contain a rotation or distortion should the physiological processes lead to a rotation or a cyclical expansion and contraction of the tissue, for example. In this case, the high-resolution image, in particular, can also find use as a reference image. Optionally, the resolution of the high-resolution reference image can be adapted to match the low-resolution images, or the low-resolution images can be adapted to match the high resolution of the high-resolution image by means of interpolation. However, one of the low-resolution buffered images with the high frame rate may alternatively also be selected as a reference image. Typically, a sufficiently sharp image is used to this end.

Moreover, the tissue cells embedded in the extracellular matrix can be classified within the scope of the method according to the invention. Such a classification can be implemented by means of suitable software. A precondition for the classification is that tissue fluid cells are not incorrectly considered to be cells embedded in the extracellular matrix, or vice versa. The present computer-implemented method according to the invention therefore creates the conditions that allow a classification of the tissue cells embedded in the extracellular matrix. The classification allows tissue cells to be labeled in accordance with their classification. By way of example, by means of the labeling, the tissue cells can be subdivided into a first type of tissue cells, which have no change in relation to the normal state, and into a second type of tissue cells, which have a change in relation to the normal state. With the aid of the classification and the labeling, it is then for example possible to preselect tissue regions which need to be examined by a pathologist in respect of changes.

The computer-implemented method according to the invention may comprise a method step in which a check is carried out for each low-resolution buffered image with the high frame rate as to whether it is suitable for obtaining the information for distinguishing between tissue fluid cells and tissue cells. Criteria for the suitability may be: sufficient contrast, sufficient sharpness, no bothersome movement artifacts, etc. Then, only the low-resolution buffered images with the high frame rate determined as being suitable for obtaining the information for distinguishing between tissue fluid cells and tissue cells are used to obtain this information. This can ensure that the quality of information obtained is not reduced by low-quality frames.

Optionally, the computer-implemented method according to the invention may also comprise a step in which a check is carried out as to whether a sufficient number of low-resolution buffered images with the high frame rate which are suitable for obtaining the information for distinguishing between tissue fluid cells and tissue cells are available. Should the check yield that a sufficient number of low-resolution buffered images with the high frame rate which are suitable for obtaining information for distinguishing between tissue fluid cells and tissue cells are not available, the computer-implemented method prompts the recording of further low-resolution images with the high frame rate. Although obtaining the information for distinguishing between tissue fluid cells and tissue cells is delayed as a result, this procedure increases the probability of being able to obtain high-quality information for distinguishing between tissue fluid cells and tissue cells.

According to a second aspect of the present invention, a computer program for determining information for distinguishing between tissue fluid cells and tissue cells in a high-resolution image of a tissue region is provided. The computer program comprises instructions which, when executed on a computer, prompt the computer to access low-resolution images with a high frame rate which were buffered before the high-resolution image was recorded and to obtain the information for distinguishing between tissue fluid cells and tissue cells from the low-resolution buffered images with the high frame rate. The computer program according to the invention consequently contains instructions, with the aid of which the computer-implemented method according to the invention can be carried out on a computer or any other data processing equipment. In the process, the computer program according to the invention may also comprise instructions, with the aid of which the described further embodiments of the computer-implemented method according to the invention can be carried out on a computer or any other data processing equipment. The properties and advantages described in relation to the computer-implemented method according to the invention and its further embodiments can thus be realized with the aid of the computer program.

According to a third aspect of the invention, a nonvolatile computer-readable storage medium is also provided, with instructions stored thereon for determining information for distinguishing between tissue fluid cells and tissue cells in a high-resolution image of a tissue region. When executed on a computer, the instructions prompt the computer to access low-resolution images with a high frame rate which were buffered before the high-resolution image was recorded and to obtain the information for distinguishing between tissue fluid cells and tissue cells from the low-resolution buffered images with the high frame rate. The nonvolatile computer-readable storage medium according to the invention allows the computer program according to the invention to be loaded into a computer or any other data processing equipment such that the computer-implemented method according to the invention can be carried out by the computer or by the other data processing equipment. The properties and advantages described in relation to the computer-implemented method according to the invention and its further embodiments can thus be realized with the aid of a computer or any other data processing equipment. According to a fourth aspect of the present invention, a data processing system for determining information for distinguishing between tissue fluid cells and tissue cells in a high-resolution image of a tissue region is provided. The data processing system, which may be based on a commercially available computer in particular, comprises a processor and at least one memory, the processor being configured, on the basis of instructions of a computer program stored in the memory, to access low-resolution images with a high frame rate which were buffered before the high-resolution image was recorded and to obtain the information for distinguishing between tissue fluid cells and tissue cells from the low-resolution buffered images with the high frame rate. With the aid of such a data processing system it is possible to realize the implementation of the computer-implemented method according to the invention and its further embodiments, and hence possible to realize the properties and advantages linked to the computer-implemented method.

According to a fifth aspect of the invention, a method for recording a high-resolution image of a tissue region with information which is assigned to the image and which serves for distinguishing between tissue fluid cells and tissue cells by means of a scanning imaging method is moreover provided. Low-resolution images of the tissue region are recorded with a high frame rate in a first scanning mode. The low-resolution recorded images with the high frame rate are buffered for a certain period of time. A trigger signal is followed by a change to a second scanning mode with a high resolution, in which a high-resolution image is recorded. Moreover, the information for distinguishing between tissue fluid cells is determined according to the steps of the computer-implemented method according to the invention. As a result, it is possible to assign information to the recorded high-resolution image, the information rendering a distinction between tissue fluid cells and tissue cells possible. In this case, the recording of the high-resolution image can be followed by a return into the first scanning mode in order to resume with the recording of low-resolution images with the high frame rate. This is advantageous, in particular, should the low-resolution buffered images with the high frame rate not comprise enough images suitable for obtaining the information for distinguishing between tissue fluid cells and tissue cells. It is then possible to use further low-resolution images with the high frame rate, which were recorded after the high-resolution image has been recorded, for the purposes of obtaining the information for distinguishing between tissue fluid cells and tissue cells.

Within the scope of the method according to the invention, the recording of a high-resolution image can automatically trigger the obtainment of the information for distinguishing between tissue fluid cells and tissue cells. No further trigger step is required as a result, which is advantageous, in particular, if scanning image recording equipment is used within the scope of an operation for the purposes of carrying out the method. Then, the surgeon only needs to trigger the recording of the high-resolution image and can then concentrate on the operation again.

Finally, the present invention also provides an optical observation apparatus, which comprises scanning image recording equipment and a data processing system according to the invention. In particular, the optical observation apparatus can be an endomicroscope and more particularly be a confocal endomicroscope or an endomicroscope designed to carry out optical coherence topography. Using the optical observation apparatus according to the invention, it is possible to carry out the method according to the invention for recording the high-resolution image of a tissue region with assigned information for distinguishing between tissue fluid cells and tissue cells. The optical observation apparatus according to the invention therefore facilitates the realization of the properties and advantages linked to the method according to the invention.

Further features, properties and advantages of the present invention will become apparent from the following description of exemplary embodiments with reference to the accompanying figures.

Figure 1:
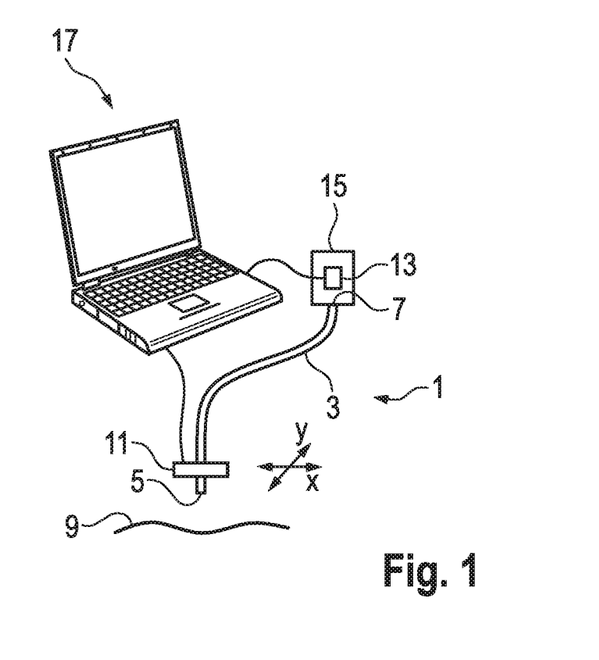
FIG. 1 shows a very schematic illustration of an endomicroscope which is configured to carry out a scanning imaging method.
Figure 2:
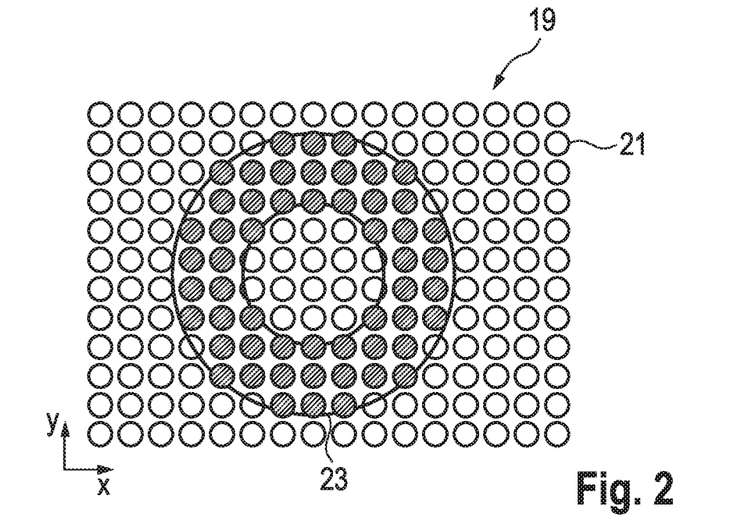
FIG. 2 shows a schematic illustration of a high-resolution image.
Figure 3:
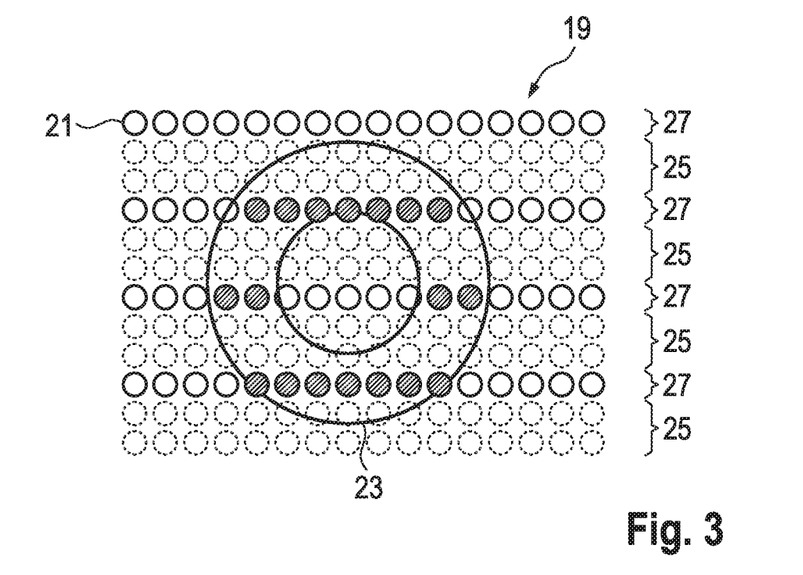
FIG. 3 shows schematic illustrations of a low-resolution image.

For explanatory purposes, the invention will be described in detail below on the basis of exemplary embodiments. Here, FIG. 1 shows an endomicroscope with a scanning device as an exemplary embodiment of an optical observation apparatus with an image recording device designed to record images of an object, said images being composed of a pixel grid. FIGS. 2 and 3 show very schematic images that have been obtained on the basis of scans carried out by the endomicroscope.

The endomicroscope 1 shown in FIG. 1 comprises an optical fiber 3 with an input end 5 and an output end 7. The input end 5 faces the observation object 9 and it is located in a scanning device 11, with the aid of which the end 5 can be moved along two lateral directions, referred to as x-direction and y-direction below, with respect to the observation object 9. In particular, the scanning device can be realized by means of microelectromechanical systems (MEMS). By way of example, a scanning device using microelectromechanical systems is described in US 2016/0051131 A1. Reference is made to this document in respect of the structure of a suitable scanning device. Alternatively, if the fiber end 5 is stationary, the observation object 9 can be scanned with the aid of a movable microelectromechanical mirror (MEMS mirror) or with the aid of a plurality of movable microelectromechanical mirrors.

The second end 7 of the optical fiber 3 faces a sensor 13, by means of which it is possible to capture luminous energy incident on the sensor 13. The sensor 13 is located in a housing 15, which is embodied as a separate module in the present exemplary embodiment but which can also be embodied as a handle, and in which, moreover, a light source (not illustrated in the figure) for generating illumination light for illuminating the observation object 9 and input coupling equipment for coupling the illumination light into the second end 7 of the optical fiber 3 are housed. In particular, the light source can be a laser light source. However, the light source can also be arranged outside of the housing 15 and be connected to the latter by way of a light guide. Then, the output end of the light guide is situated in the housing 15. In this case, the input coupling equipment couples the illumination light emerging from the output end of the light guide into the second end 7 of the optical fiber 3. The illumination light can be white light, i.e., have a broadband spectrum, or light with a spectrum that consists of one or more narrow-band spectral ranges, for example of one or more narrow-band spectral ranges suitable for exciting a fluorescence in the observation object 9.

Illumination light coupled into the second end 7 of the optical fiber 3 is guided through the optical fiber 3 to the first end 5, from where the illumination light emerges in the direction of the observation object 9. Illumination light reflected by the observation object 9 or light excited by the illumination light and emitted by the observation object 9, for instance fluorescent light, enters into the first end 5 of the optical fiber 3 in turn and is guided from the latter to the second end 7, from where it emerges in the direction of the sensor 13. Moreover, focusing optical units can be located at, or in front of, the ends 5, 7 of the optical fiber 3 and these can be used to focus light onto the surface of the observation object 9 or onto the sensor 13. In particular, the endomicroscope 1 can be embodied as a confocal endomicroscope. In addition or as an alternative thereto, it can also be embodied as an endomicroscope for carrying out optical coherence tomography (OCT). Confocal microscopy and optical coherence tomography are well-known methods and are described in US 2010/0157308 A1 and U.S. Pat. No. 9,921,406 B2, for example. Therefore, the description of details in respect of confocal microscopy and in respect of optical coherence tomography is dispensed with in the scope of the present description. Instead, reference is made to US 2010/0157308 A1 and U.S. Pat. No. 9,921,406 B2.

Recording the image with the aid of the endomicroscope 1 is controlled with the aid of a computer 17 in the present exemplary embodiment. However, the control can also be implemented by means of a dedicated control device. The computer 17 used for controlling in the present exemplary embodiment is connected both to the scanning device 11 and to the sensor 13. In the present exemplary embodiment, the scanning device 11 is controlled by the computer 17 in such a way that the observation object 9 is scanned along a grid 19 with grid points 21 (see FIG. 2). At each scanned grid point 21 there is an illumination of the observation object 9 with illumination light and a recording of the reflected illumination light or of the light emitted by the observation object 9 on account of an excitation by means of the illumination light. Then, the computer generates an image from the reflected illumination light recorded at the grid points 21 or from the light emitted by the observation object recorded at the grid points 21, the pixel grid of said image corresponding to the grid 19 used during the scanning. Therefore, the optical fiber 3, the scanning device 11, the sensor 13 and the computer 17 together form an image recording device, in which the computer 17 serves as image generation device.

In the present exemplary embodiment, the grid comprises grid lines which extend in the x-direction in FIG. 2 and grid columns which extend in the y-direction in FIG. 2. Here, in the present exemplary embodiment, scanning of the observation object is carried out line-by-line, i.e., in such a way that a line is scanned, i.e., there is a scan along the x-direction, and, after the line has been completed, there is an offset of the optical fiber 3 in the y-direction before a line extending in the x-direction is scanned again using the optical fiber 3, which has been offset in the y-direction. During the scanning procedure, the sensor 13 is exposed to each grid point 21, at which the optical fiber is situated at the time of a recording. In this way, an image of the observation object 9, as shown schematically in FIG. 2, is generated line-by-line with the aid of the sensor 13 and the scanning device 11.

FIG. 2 very schematically shows an image in which all grid points 21 of the grid 19 have been used when scanning the observation object 9. Here, FIG. 2 schematically shows a structure 23 of the observation object 9, which is represented by a ring for illustration purposes. Grid points 21 situated over the structure 23 lead to a different signal on the sensor 13 than those grid points 21 that are not situated over the structure 23. In FIG. 2, the signal generated by the grid points 21 situated over the structure 23 is represented by hatched grid points 21. A high resolution of structures 23 in the observation object 9 is possible with small dimensions of the grid points 21 and correspondingly small pitches between the grid points 21, as are facilitated by the use of the optical fiber 3. On account of the large number of grid points to be scanned in connection with the high resolution, the generation of a high-resolution image with the aid of the scanning imaging method requires comparatively much time. Should a video sequence be recorded using the scanning imaging method, only low frame rates can therefore be achieved on account of the time duration required for recording a frame with the aid of the scanning imaging method.

To increase the frame rate there is the option of reducing the number of grid points 21 used during the scanning, as shown in FIG. 3, in order to increase the speed with which the scan can be carried out for a frame. To this end, in the present exemplary embodiment the scanning device 11 can be acted upon in controlling fashion by the computer 17 in such a way that certain lines 25 are omitted when scanning along the grid 19. Expressed differently, only every n-th line is scanned during scanning, as illustrated schematically in FIG. 3 where, by way of example, only every third line is scanned. The grid points 21 of the lines 21 used during the scanning are represented by full lines in the figure while the grid points 21 of the lines 25 omitted during the scanning are represented by dashed lines. In the shown illustration, only every third line of the grid 19 is used during the scanning, and so the frame rate can be approximately tripled. In reality, more than two lines are omitted between two scanned lines in order to increase the frame rate to at least 4 fps.

The omission of lines 25 during the scanning leads to a reduction in the image resolution in the y-direction. It is evident from FIG. 3 that, on account of the reduced number of lines, fewer grid points 21 are available in the image for representing the structure 23 than when using all lines.

While recording a video stream with a reduced resolution may be sufficient in some cases, for example for as long as there is only navigation to an examination site, there are situations in which a high-resolution image of the structures 23 of the observation object 9 is required. This applies, in particular, if the endomicroscope 1 has reached the examination site and the examination site should be examined in respect of changes.

While the video stream is recorded, the low-resolution frames of the video stream are buffered in the memory of the computer 17 for a certain amount of time in the present exemplary embodiment, for the purposes of which use can be made, for example, of a circular buffer, i.e., a memory in which data are stored for a certain storage time and, in this case, the data in the memory for which the storage time has elapsed are overwritten with current data. When the user has reached the examination site, they can trigger the recording of a high-resolution image by virtue of entering a corresponding command into the computer 17 as a trigger signal. By way of example, the command can be a keyboard entry or, should the computer 17 be equipped to accept voice commands, a voice command. However, it is also possible to use an external input apparatus, which is connected to the computer 17 by wire or radio. By way of example, such an external input apparatus can be a foot switch, following the actuation of which a trigger signal is transmitted to the computer 17. Compared to a keyboard entry, foot switch and voice commands are advantageous in that the user of the endomicroscope 1 requires no hands for generating the trigger signal.

Figure 4:
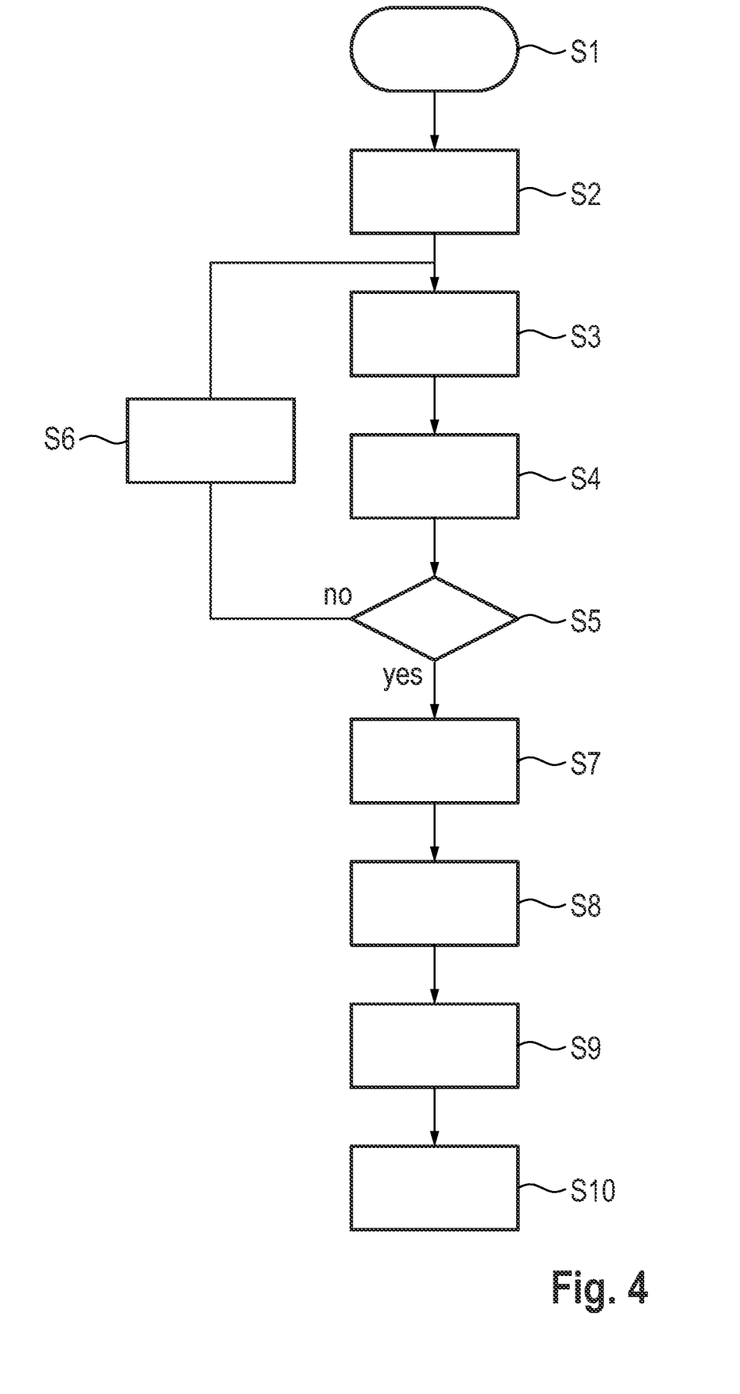
FIG. 4 shows, on the basis of a flowchart, an example of the computer-implemented method for determining information for distinguishing between tissue fluid cells and tissue cells in a high-resolution image.

An embodiment of the computer-implemented method for determining information for distinguishing between tissue fluid cells and cells embedded in an extracellular matrix in a high-resolution image is explained below on the basis of the flowchart depicted in FIG. 4.

In the present exemplary embodiment, the computer-implemented method is carried out on the computer 17. Its implementation is triggered by a trigger signal, for example by actuating a foot switch, by way of a keyboard input or a voice command. The trigger signal may be a signal designed only for carrying out the method but, like in the previous embodiment, it may also be a signal coupled to the trigger of a high-resolution image 34 (see FIG. 5). Once the method has been started in step S1 following the trigger signal, the method in step S2 accesses the low-resolution frames 33A-E of the video stream stored in the circular buffer, which were recorded before the high-resolution image 34 was recorded. Should the low-resolution frames 33A-E not be stored in a memory of the computer 17 but be stored externally, for example in a memory of the endomicroscope 1, accessing the low-resolution frames 33A-E of the video stream also comprises reading the low-resolution frames 33A-E into the computer 17. It should be noted at this point that the low-resolution frames 33A-E are the frames of a video stream in the present embodiment but that this is not mandatory for the present invention.

After the buffered frames 33A-E have been accessed in step S2, the quality of the frames 33A-E is evaluated in step S3 and the frames whose quality is too low are rejected. The evaluation of the frames in respect of their quality can be implemented, in particular, in view of the sharpness of the respective frame, the presence of movement artifacts, the contrast, etc. In particular, a quality parameter can be determined on the basis of the image sharpness, the contrast, the presence of movement artifacts, etc. Those low-resolution frames 33A-E which do not reach a specified value of the quality parameter are rejected. In the process, there also is the option of defining a plurality of quality parameters and rejecting all those images which do not reach the specified value for at least one quality parameter.

Frames whose quality has a sufficient value are subjected to a check in step S4 to the effect of whether there is a sufficient overlap of the image fields of the respective frames. The frames for which there is no sufficient overlap of the image fields are rejected. To determine a sufficient overlap, a reference image can for example be determined from the low-resolution frames 33A-E and the overlap of the remaining frames 33A-E with the reference image can be determined. By way of example, the overlap can be represented by a numerical value which indicates what portion of the image field of the respective frame 33A-E corresponds to the image field of the reference image. Even though the frames with an insufficient image quality are rejected first in the present embodiment before the frames which do not have sufficient overlap with the reference image are rejected, it is also possible to reverse the sequence of the test, that is to say first reject those frames which do not have a sufficient overlap with the reference image and subsequently reject those frames whose quality is insufficient. Instead of a frame, the high-resolution image 34 may also serve as a reference image.

After the images whose quality was insufficient or which did not have a sufficient overlap have been rejected in steps S3 and S4, a check is carried out in step S5 as to whether the remaining number of low-resolution frames 33A-E is sufficient to determine the information for distinguishing between tissue fluid cells and tissue cells embedded in an extracellular matrix. By way of example, a lower limit for the number of frames, which should not be undershot, can be specified to this end. Additionally or as an alternative, it is possible to specify a maximum time interval between two low-resolution frames 33A-E which should not be exceeded. Further additionally or as a further alternative, it is also possible to specify an overall time interval that should be covered by the low-resolution frames 33A-E.

Should the number of low-resolution frames 33A-E be determined in step S5 as being insufficient for determining the information for distinguishing between tissue fluid cells and tissue cells embedded in an extracellular matrix, the method advances to step S6, in which further low-resolution frames 35A-C are added to the already available frames 33A-E. Typically, the endomicroscope 1 continues to record low-resolution frames 35A-C after the high-resolution image has been created. Therefore, the low-resolution frames 35A-C recorded after the high-resolution image has been created merely need to be accessed in step S6. Should the endomicroscope 1 not automatically continue recording low-resolution frames 35A-C after the high-resolution image 34 was created, recording a number of low-resolution frames 35A-C is triggered in step S6. Independently of whether recording a number of low-resolution frames 35A-C is triggered in step S6 or whether the endomicroscope 1 automatically continues recording low-resolution frames 35A-C after the high-resolution image 34 was created, the method returns from step S6 to step S3 in order to carry out the check of steps S3, S4 and S5 again. This is carried out until a sufficient number of low-resolution frames 33A-E, 35A-C is determined as being available in step S5.

Figure 5:
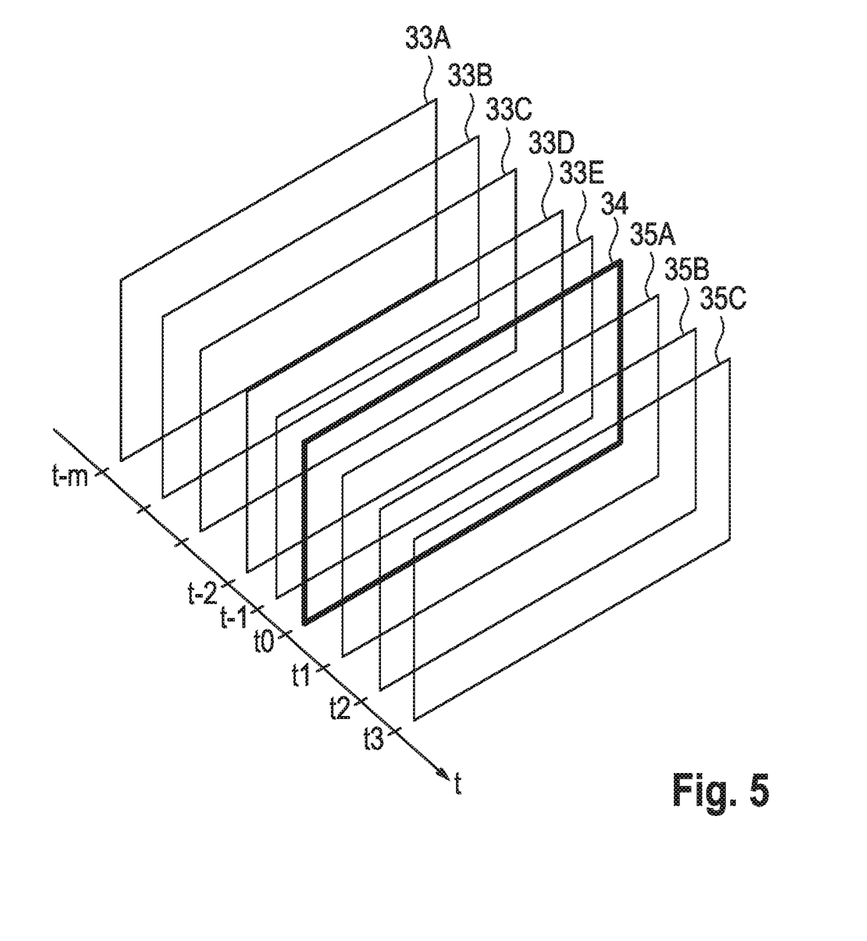
FIG. 5 shows a sequence of recorded images.

FIG. 5 shows a schematic illustration of the temporal sequence of recording low-resolution frames 33A-E and 35A-C, which are recorded at different times and used in steps S3 to S6. Furthermore, FIG. 5 represents a high-resolution image 34, which was recorded at a time to. Triggering the high-resolution image 34 at the time $t_0$ for example simultaneously triggers the determination of information for distinguishing between tissue fluid cells and tissue cells in the high-resolution image 34. To this end, according to step S2, the buffered low-resolution frames recorded at times $t_{-1}$ to $t_{-m}$ are evaluated according to steps S3 to S5. At the same time, recording low-resolution frames 35A-C is continued in the present exemplary embodiment after the high-resolution image 34 has been recorded. Should the evaluation according to steps S3 to S5 yield that the number of low-resolution frames 33A-E that meet the required quality criteria does not suffice for determining the information for distinguishing between tissue fluid cells and tissue cells embedded in an extracellular matrix, low-resolution frames 35A-C recorded at times $t_1$-$t_3$ are added, said low-resolution frames 35A-C having been recorded after the high-resolution image 34 was recorded. As soon as a sufficient number of low-resolution frames that meet the quality criteria are determined as being available in step S5, the method continues with step S7, in which it registers the low-resolution images.

As soon as a sufficient number of low-resolution frames 33A-E, 35A-C are determined as being available in step S5, the method advances to step S7, in which the low-resolution frames are registered in relation to the reference image. If the reference image is the high-resolution image 34, it is advantageous for the quality of the registration if pixel values for the pixels omitted in the low-resolution frames 33A-E, 35A-C are calculated by means of an interpolation of the pixels that were not omitted.

Figure 6:
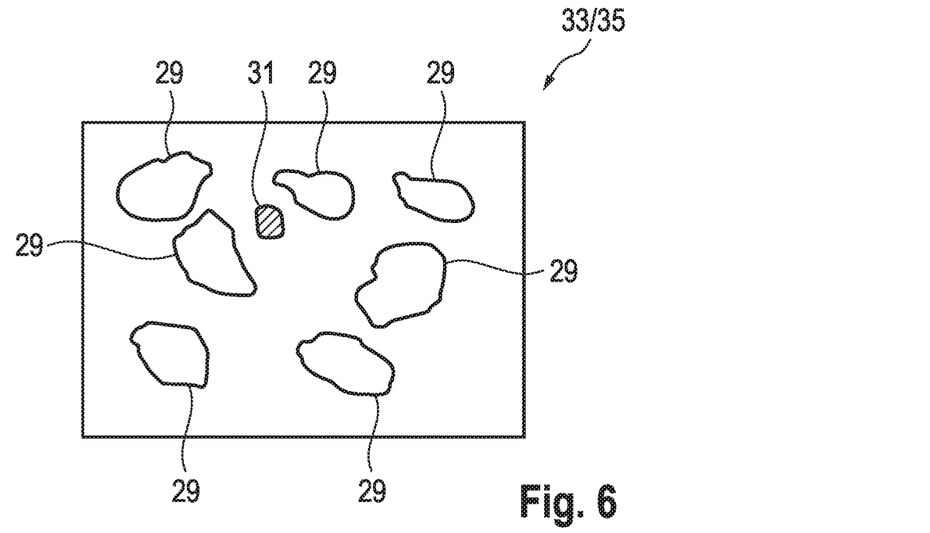
FIG. 6 shows a very schematic illustration of an image with tissue cells and a tissue fluid cell in a first position.
Figure 7:
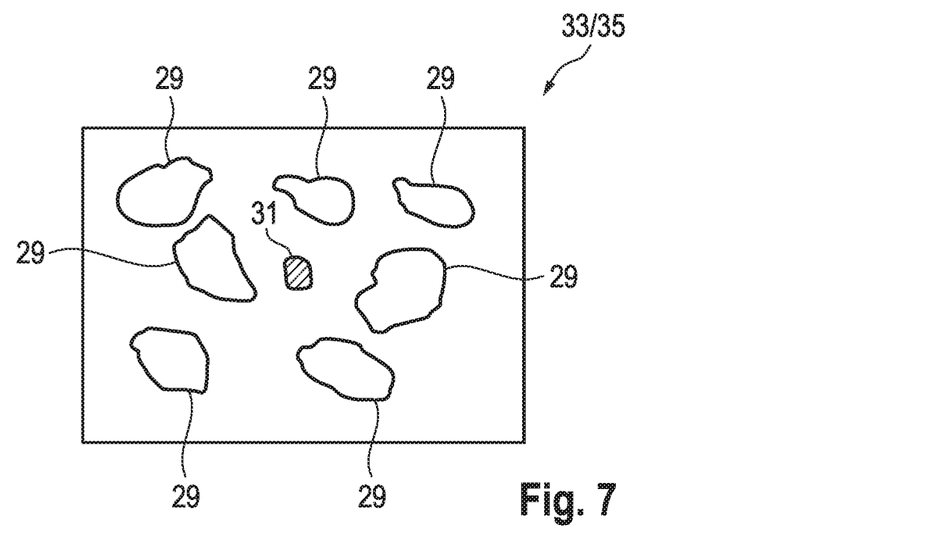
FIG. 7 shows the image of FIG. 6 with the tissue fluid cell in a second position.

Using the comparison of the registered frames with one another as a basis, the image elements which in each case adopt the same position in the image field in the frames 33A-E, 35A-C are then determined in step S8 of the present embodiment. These image elements are depicted in FIGS. 6 and 7 and are labeled by reference sign 29. By comparing the low-resolution frames 33A-E, 35A-C with one another, those image elements that adopt different positions in the frames 33A-E, 35A-C are moreover determined. Such an image element is depicted in FIGS. 6 and 7 and is labeled by reference sign 31 in exemplary fashion. Those image elements 29 in the frames 33A-E, 35A-C which are always present in the same position of the image field represent the tissue cells embedded in the extracellular matrix while the image elements 31 whose position differs in the various image fields of the frames represent the moving tissue fluid cells.

After the information regarding which image elements represent tissue cells embedded in an extracellular matrix and which image elements represent tissue fluid cells was obtained in step S8, the information obtained is suitably processed for display in step S9. By way of example, the preparation may include the tissue cells embedded in the extracellular matrix or the tissue fluid cells being emphasized by color in the high-resolution image. Alternatively, there is also the option of generating a short video sequence on the basis of the low-resolution frames 33A-E, 35A-C, said video sequence being overlaid on the high-resolution image following a registration with the high-resolution image 34. Instead of an overlay, there is also the option of presenting the video sequence next to the high-resolution image 34. The prepared information is then output for display on an external monitor (step S10). Alternatively, the information can also be presented on the monitor of the computer 17. The method ends with the presentation of the information.

The tissue cells can be classified following the determination of the information which allows the tissue cells embedded in the extracellular matrix to be distinguished from the tissue fluid cells. Such a classification can be implemented by means of suitable software and, for example, be based on methods as described in the following publications: A. BenTaieb et al. "Deep Learning Models for Digital Pathology", arXiv:1910:12329v2 [cs.CV] 29 Oct. 2019; A. Bizzego et al. "Evaluating reproducibility of AI algorithms in digital pathology with DAPPER" in PLoS Comput Biol 15(3):e1006269, Mar. 27, 2019 and T. Fuchs et al. "Computational pathology: Challenges and promises for tissue analysis" in Computerized Medical Imaging and Graphics 35 (2011), pages 515-530. With the aid of the classification, it is possible to label the tissue cells differently in the present exemplary embodiment. By way of example, labeling allows a distinction to be made in the high-resolution image between tissue cells which do not have a change in relation to the normal state and those which do have a change.

The present invention has been described in detail on the basis of exemplary embodiments for explanatory purposes. However, a person skilled in the art recognizes that there can be deviations from the exemplary embodiments within the scope of the present invention, as has also already been indicated within the scope of the exemplary embodiments. Thus, it is for example possible to merely merge the registered low-resolution frames into a short video sequence that is presented next to the high-resolution image instead of the option of determining, on the basis of the low-resolution frames, image regions forming the background and image regions that move in relation to the background. In the video sequence constructed from the registered low-resolution frames, a user of the endomicroscope can identify the tissue fluid cells on the basis of their movement presented in the short video sequence. Hence, an automated determination of the image regions that form the image background and of the image regions that move in relation to the determined image background, as was implemented in the described exemplary embodiment, is not mandatory. A person skilled in the art recognizes that further modifications of the described exemplary embodiments are possible. Therefore, the present invention is intended to be restricted only by the appended claims.

LIST OF REFERENCE SIGNS

1 Endomicroscope
3 Optical fiber
5 First end
7 Second end
9 Observation object
11 Scanning device
13 Sensor
15 Housing
17 Computer
19 Grid
21 Grid point
23 Structure
25 Omitted lines
27 Scanned lines
29 Image background-forming image elements
31 Image elements moving in relation to the image background
33 Low-resolution images
34 High-resolution image
S1 Start
S2 Reading buffered images
S3 Selection according to image quality
S4 Selection according to image field
S5 Checking whether a sufficient number of low-resolution frames is available
S6 Adding further low-resolution frames
S7 Registering the low-resolution frames
S8 Determining the image elements forming the image background and image elements moving in relation to the image background
S9 Processing the information
S10 Outputting the information for display purposes

The invention claimed is:

1. An endomicroscope configured to distinguish between first cells that are located in a tissue fluid and second cells that are bound to an extracellular matrix within an observation object, wherein the endomicroscope comprises:
  a scanning image recording equipment comprising an image recording device with a scanning device configured to scan at least a two-dimensional array of grid points relative to the observation object for recording low resolution images and a high-resolution image, wherein the high-resolution image has a number of the grid points and the low resolution images have a subset of the number of the grid points, and wherein the low resolution images can be recorded with a higher frame rate compared to the high-resolution image based on the subset of the number of the grid points being less than the number of the grid points,
  a data processing system configured to determine the first cells and the second cells, as information in the high-resolution image, based on image elements that move in relation to an image background within buffered ones of the low-resolution images being the first cells and certain image elements that do not move in relation to the image background within the buffered ones of the low-resolution images being the second cells,
  outputting for display, or causing a presenting on a display, the information in the high-resolution image or next to the high-resolution image,
  wherein the image elements that move in relation to the image background are represented with emphasis as the first cells.

2. The endomicroscope as claimed in claim 1, wherein the data processing system is configured to determine the information based on a video sequence being generated from at least some of the low-resolution buffered images with the higher frame rate.

3. The endomicroscope as claimed in claim 2, wherein the buffered ones of the low-resolution images with the higher frame rate are registered in relation to a reference image.

4. The endomicroscope as claimed in claim 1, wherein the second cells are classified.

5. The endomicroscope as claimed in claim 4, wherein the second cells are labeled in the high-resolution image in accordance with their classification.

6. The endomicroscope as claimed in claim 1, wherein the data processing system is further configured to determine the buffered ones of the low-resolution images based on which low-resolution images satisfy an image quality threshold, satisfy an overlap threshold with other low-resolution images, or a combination thereof.

7. The endomicroscope as claimed in claim 6, wherein the data processing system is further configured to determine whether the buffered ones of the low-resolution images satisfy a number threshold, and the data processing system is further configured to prompt the recording of further low-resolution images with the higher frame rate when the buffered ones of the low-resolution images do not satisfy the number threshold.

8. The endomicroscope as claimed in claim 1, wherein the image elements represented with emphasis as the first cells are overlaid on the high-resolution image.

9. The endomicroscope as claimed in claim 1, wherein the second cells are cells of epithelial tissue, cells of connective and supporting tissue, cells of muscle tissue, and cells of nerve tissue, and the tissue fluid is in blood or in lymph.

10. The endomicroscope as claimed in claim 1, wherein the image elements that move in relation to the image background are represented with emphasis in an image as the first cells, if a sufficient number of low-resolution buffered images with the higher frame rate are available.

11. A method for recording a high-resolution image of a tissue region for distinguishing between first cells that are located in a tissue fluid within the tissue region and second cells that are bound to an extracellular matrix within the tissue region, the method comprising:
  recording, by a scanning device of a scanning image recording equipment of an endomicroscope, which is configured to scan at least a two-dimensional array of grid points relative to the tissue region during the recording, low-resolution images of the tissue region with a higher frame rate in a first scanning mode,
  buffering, by the endomicroscope, the low-resolution recorded images with the higher frame rate for a certain period of time, and
  in response to a trigger signal: changing, by the endomicroscope, to a second scanning mode with a higher resolution, in which a high-resolution image is recorded, wherein the high-resolution image includes a number of the grid points, and the low-resolution images include a subset of the number of the grid points, determining, by a data processing system of the endomicroscope, the first cells and the second cells, as information, based on image elements that move in relation to an image background within the buffered low-resolution recorded images with the higher frame being the first cells and certain image elements that do not move in relation to the image background within the buffered ones of the low-resolution images being the second cells, and outputting for display, or causing a presenting on a display, the information in the high-resolution image or next to the high-resolution image, wherein the image elements that move in relation to the image background are represented with emphasis as the first cells.

12. The method as claimed in claim 11, wherein the recording of the high-resolution image is followed by a return into the first scanning mode and the method resumes with the recording of low-resolution images with the higher frame rate.

13. The method as claimed in claim 11, wherein the recording of a high-resolution image triggers the determining the information.

14. A non-transitory computer-readable storage medium with instructions stored thereon for distinguishing between first cells that are located in a tissue fluid and second cells that are bound to an extracellular matrix in a high-resolution image of a tissue region, said instructions, when executed by a processor of an endomicroscope, cause the processor to perform the steps of:

causing a scanning image recording equipment comprising an image recording device with a scanning device configured to scan at least a two-dimensional array of grid points relative to the tissue region to record the high-resolution image with a number of the grid points and low-resolution images with a subset of the number of the grid points which were buffered before the high-resolution image was recorded;

determining the first cells and the second cells, as information, from the low-resolution buffered images with the higher frame rate based on image elements that move in relation to an image background within the low-resolution buffered images being the first cells and certain image elements that do not move in relation to the image background within the buffered ones of the low-resolution images being the second cells; and causing a presenting on a display the information in the high-resolution image or next to the high-resolution image, wherein the image elements that move in relation to the image background are represented with emphasis as the first cells.

15. A computer-implemented method for distinguishing between first cells that are located in a tissue fluid and second cells that are bound to an extracellular matrix in a high-resolution image of a tissue region, the method comprising:

obtaining, by an optical observation apparatus, low-resolution images with a higher frame rate which were buffered before the high-resolution image was recorded at a lower frame rate;

determining, by the optical observation apparatus, which ones of the low-resolution images satisfy an image quality threshold, satisfy an overlap threshold with other of the low-resolution buffered images, or a combination thereof;

determining, by the optical observation apparatus, whether the one of the low-resolution images satisfy a number threshold;

when the ones of the low-resolution images do not satisfy the number threshold, prompting, by the optical observation apparatus, the recording of more low-resolution images with the higher frame rate; and determining, by the optical observation apparatus, the first cells and the second cells, as information, from the ones of the low-resolution buffered images with the higher frame rate based on image elements that move in relation to an image background within the ones of the low-resolution buffered images being the first cells and certain image elements that do not move in relation to the image background within the buffered ones of the low-resolution images being the second cells, wherein the image elements that move in relation to the image background are represented with emphasis as the first cells.

16. An endomicroscope configured to distinguish between first cells that are located in a tissue fluid and second cells that are bound to an extracellular matrix within an observation object, wherein the endomicroscope comprises:

a scanning image recording equipment comprising an image recording device with a scanning device configured to scan at least a two-dimensional array of grid points relative to the observation object for recording low resolution images and a high-resolution image, wherein the high-resolution image has a number of the grid points and the low resolution images have a subset of the number of the grid points, and wherein the low resolution images can be recorded with a higher frame rate compared to the high-resolution image based on the subset of the number of the grid points being less than the number of the grid points, a data processing system configured to determine on the first cells and the second cells, as information in the high-resolution image, based on image elements that move in relation to an image background within buffered ones of the low-resolution images, outputting for display, or causing a presenting on a display, the information in the high-resolution image or next to the high-resolution image, wherein the data processing system is configured to determine the information based on a video sequence being generated from at least some of the low-resolution buffered images with the higher frame rate, and the high-resolution image is overlaid on each frame of the video sequence.

* * * * *